(12) United States Patent
Yang et al.

(10) Patent No.: US 10,197,886 B2
(45) Date of Patent: Feb. 5, 2019

(54) DISPLAY SPECTACLES HAVING MICROPRISM STRUCTURES AND DRIVING METHOD THEREOF

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Ming Yang, Beijing (CN); Qian Wang, Beijing (CN); Xiaochuan Chen, Beijing (CN); Wenqing Zhao, Beijing (CN); Jian Gao, Beijing (CN); Pengcheng Lu, Beijing (CN); Xiaochen Niu, Beijing (CN); Rui Xu, Beijing (CN); Lei Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/540,107

(22) PCT Filed: May 18, 2016

(86) PCT No.: PCT/CN2016/082443
§ 371 (c)(1),
(2) Date: Jun. 27, 2017

(87) PCT Pub. No.: WO2017/161656
PCT Pub. Date: Sep. 28, 2017

(65) Prior Publication Data
US 2018/0046059 A1   Feb. 15, 2018

(30) Foreign Application Priority Data
Mar. 25, 2016 (CN) .......................... 2016 1 0179809

(51) Int. Cl.
*G02F 1/33* (2006.01)
*H04N 13/305* (2018.01)
(Continued)

(52) U.S. Cl.
CPC ........... *G02F 1/33* (2013.01); *G02B 27/2214* (2013.01); *G06F 3/011* (2013.01); *H04N 13/305* (2018.05);
(Continued)

(58) Field of Classification Search
CPC ....................................................... G02F 1/33
(Continued)

(56) References Cited

U.S. PATENT DOCUMENTS

| 5,440,197 A | 8/1995 | Gleckman |
| 2011/0122051 A1 | 5/2011 | Choi |

(Continued)

FOREIGN PATENT DOCUMENTS

| CN | 1132558 A | 10/1996 |
| CN | 102099725 A | 6/2011 |

(Continued)

OTHER PUBLICATIONS

International Search Report for Chinese International Application No. PCT/CN2016/052443 dated Dec. 21, 2016.
(Continued)

*Primary Examiner* — Long D Pham
(74) *Attorney, Agent, or Firm* — Calfee, Halter & Griswold LLP (57) ABSTRACT

Display spectacles and a driving method thereof are disclosed. The display spectacles include a spectacle frame and two display devices provided on the spectacle frame as spectacle lenses. Each of the display devices includes a backlight, a lower substrate on a light exit side of the backlight, an upper substrate arranged opposite to the lower
(Continued)

substrate, a liquid crystal layer located between the upper substrate and the lower substrate, a plurality of electrode structures located between the upper substrate and the lower substrate, and a control unit. During displaying, the electrode structure deflects liquid crystal molecules in the liquid crystal layer corresponding to the electrode structure to form a microprism structure. The control unit adjusts a voltage on the electrode structure, thereby controlling total internal reflection or refraction of the microprism structure for light emitted from the backlight, and the adjustment for display gray scale can thus be realized.

17 Claims, 7 Drawing Sheets (51) Int. Cl.
    *G02B 27/22* (2018.01)
    *G06F 3/01* (2006.01)
    *H04N 13/344* (2018.01)
    *G02B 27/01* (2006.01)
    *G03H 1/22* (2006.01)

(52) U.S. Cl.
    CPC ... *H04N 13/344* (2018.05); *G02B 2027/0174* (2013.01); *G03H 2001/2223* (2013.01); *G03H 2001/2242* (2013.01); *G03H 2226/02* (2013.01); *G09G 2354/00* (2013.01)

(58) Field of Classification Search
    USPC .......................................................... 345/6, 8
    See application file for complete search history.

(56) References Cited

U.S. PATENT DOCUMENTS

| | | | |
|---|---|---|---|
| 2012/0086623 A1 | 4/2012 | Takagi et al. | |
| 2013/0222234 A1 | 8/2013 | Tanaka et al. | |
| 2014/0300839 A1 | 10/2014 | Choe et al. | |
| 2015/0177516 A1* | 6/2015 | Blonde | G02B 27/017 359/316 |
| 2015/0234187 A1* | 8/2015 | Lee | G02B 27/0172 345/8 |
| 2016/0054573 A1* | 2/2016 | Kasano | H04N 13/0415 349/33 |
| 2016/0313565 A1 | 10/2016 | Wang et al. | |
| 2017/0085865 A1* | 3/2017 | Sumi | H04N 13/0404 |
| 2017/0123204 A1* | 5/2017 | Sung | G02B 3/14 |

FOREIGN PATENT DOCUMENTS

| | | |
|---|---|---|
| CN | 102445755 A | 5/2012 |
| CN | 103176308 A | 6/2013 |
| CN | 103383491 A | 11/2013 |
| CN | 103558724 A | 2/2014 |
| CN | 103576399 A | 2/2014 |
| CN | 104102062 A | 10/2014 |
| KR | 20130106719 A | 9/2013 |

OTHER PUBLICATIONS

Text of First Office Action for Chinese Patent Application No. 201610179809.4 dated May 25, 2018.

* cited by examiner

DISPLAY SPECTACLES HAVING MICROPRISM STRUCTURES AND DRIVING METHOD THEREOF

RELATED APPLICATIONS

The present application is the U.S. national phase entry of the international application PCT/CN2016/082443, with an international filing date of May 18, 2016, which claims the benefit of Chinese Patent Application No. 201610179809.4, filed on Mar. 25, 2016, the entire disclosures of which are incorporated herein by reference.

TECHNICAL FIELD

The present disclosure relates to the field of display technology, in particular to display spectacles and a driving method thereof.

BACKGROUND

An existing liquid crystal display panel typically includes an array substrate and a color film substrate disposed oppositely, a liquid crystal layer located between the array substrate and the color film substrate, a common electrode, a pixel electrode, and polarizers respectively located on the array substrate and the color film substrate.

The existing liquid crystal display panel converts natural light into linearly polarized light through the polarizer on the array substrate. A voltage is applied on the pixel electrode and the common electrode to form an electric field in the liquid crystal layer. The liquid crystal molecules in the liquid crystal layer are rotated by the electric field, so as to change the polarization state of the linearly polarized light. The polarizer on the color film substrate then analyzes the polarization state of the linearly polarized light. By controlling the magnitude of the electric field the polarization state can be adjusted. Different polarization states mean different light transmittance of the liquid crystal display panel, thereby achieving gray scale display for images.

For a wearable display, the viewing distance of the human eye and the display lens is relatively close, and the viewing angle is larger. Therefore, the display effect is not ideal if an existing liquid crystal display panel is used as a spectacle lens for producing display spectacles.

SUMMARY

To this end, embodiments of the disclosure provide display spectacles and a driving method thereof, thereby realizing a wearable display device.

An exemplary embodiment of the disclosure provides display spectacles. The display spectacles include a spectacle frame and two display devices provided on the spectacle frame as spectacle lenses. Each of the display devices includes a backlight, a lower substrate on a light exit side of the backlight, an upper substrate arranged opposite to the lower substrate, a liquid crystal layer located between the upper substrate and the lower substrate, a plurality of electrode structures located between the upper substrate and the lower substrate, and a control unit.

During displaying, the electrode structure deflects liquid crystal molecules in a corresponding region of the liquid crystal layer to form a microprism structure. The control unit adjusts a voltage on the electrode structure, thereby controlling total internal reflection or refraction of the microprism structure for light emitted from the backlight.

In an exemplary implementation of the display spectacles provided by an embodiment of the disclosure, several microprism structures constitute one sub-pixel, and a plurality of sub-pixels are arranged in an array.

In an exemplary implementation of the display spectacles provided by an embodiment of the disclosure, in each display device, the microprism structure refracts light emitted from the backlight. An exit angle is formed between an outgoing light beam of the microprism structure and a display plane of the display device. The exit angle decreases as a viewing distance increases.

In an exemplary implementation of the display spectacles provided by an embodiment of the disclosure, the greater an equivalent optical path of the microprism structure along a cell thickness of the display device, the smaller a voltage difference applied on the electrode structure corresponding to the liquid crystal molecules forming the microprism structure.

In an exemplary implementation of the display spectacles provided by the embodiment of the disclosure, the microprism structure is a triangular prism structure or a polygonal prism structure.

In an exemplary implementation of the display spectacles provided by the embodiment of the disclosure, the triangular prism structure is a right angle triangular prism structure.

In an exemplary implementation of the display spectacles provided by the embodiment of the disclosure, each electrode structure includes a first transparent electrode and a second transparent electrode respectively located on both sides of the liquid crystal layer. The first transparent electrode is a planar electrode. The second transparent electrode includes a plurality of sub-electrodes arranged in parallel and extending in a straight line.

In an exemplary implementation of the display spectacles provided by the embodiment of the disclosure, the sub-electrode is composed of at least one linear electrode or a plurality of punctate electrodes.

In an exemplary implementation of the display spectacles provided by the embodiment of the disclosure, each display device further includes a color conversion layer. The color conversion layer is located on a side of the liquid crystal layer departing from the lower substrate, the color conversion layer is used for converting light passing through the liquid crystal layer and corresponding to the microprism structure into monochromatic light. Alternatively, the color conversion layer is located on a side of the liquid crystal layer departing from the upper substrate, the color conversion layer is used for converting light emitted from the backlight and corresponding to the microprism structure into monochromatic light.

Light emitted from the backlight is converted into light of at least three colors after passing through the color conversion layer.

In an exemplary implementation of the display spectacles provided by the embodiment of the disclosure, the color conversion layer is a light splitting film or a color filter film.

In an exemplary implementation of the display spectacles provided by the embodiment of the disclosure, a polarizer is located between the lower substrate and the backlight.

An embodiment of the disclosure further provides a method for driving the above mentioned display spectacles. The method includes the steps of receiving an image signal to be displayed; and based on a gray scale value for a sub-pixel in the image signal to be displayed, controlling a voltage value on the electrode structure, thereby controlling total internal reflection or refraction of the microprism structure for light emitted from the backlight and displaying a corresponding gray scale.

In an exemplary implementation, the method provided by the embodiment of the disclosure further includes in a three-dimensional display mode, displaying different images with these two display devices respectively.

The embodiments of the present disclosure provide display spectacles and a driving method thereof. The display spectacles include a spectacle frame and two display devices provided on the spectacle frame as spectacle lenses. Each of the display devices includes a backlight, a lower substrate on a light exit side of the backlight, an upper substrate arranged opposite to the lower substrate, a liquid crystal layer located between the upper substrate and the lower substrate, a plurality of electrode structures located between the upper substrate and the lower substrate, and a control unit. During displaying, the electrode structure deflects liquid crystal molecules in a corresponding region of the liquid crystal layer to form a microprism structure. The control unit adjusts a voltage on the electrode structure, thereby controlling total internal reflection or refraction of the microprism structure for light emitted from the backlight, and the adjustment for display gray scale can thus be realized. In the display spectacles provided by the embodiment of the present disclosure, the formed microprism structure is used to control the propagation path of light emitted by the spectacle lens, thereby controlling the viewing angle for the spectacle lens. The display spectacles are adapted to the characteristics of wearable display device such as a large viewing angle and a close viewing distance.

DETAILED DESCRIPTION OF THE INVENTION

In the following, the implementations of display spectacles and a driving method thereof provided by the embodiments of the disclosure will be described clearly and completely in connection with the drawings.

The shapes and sizes of the elements in the drawings do not reflect the real scale of the display spectacles, but to schematically illustrate the content of the disclosure.

Figure 1:
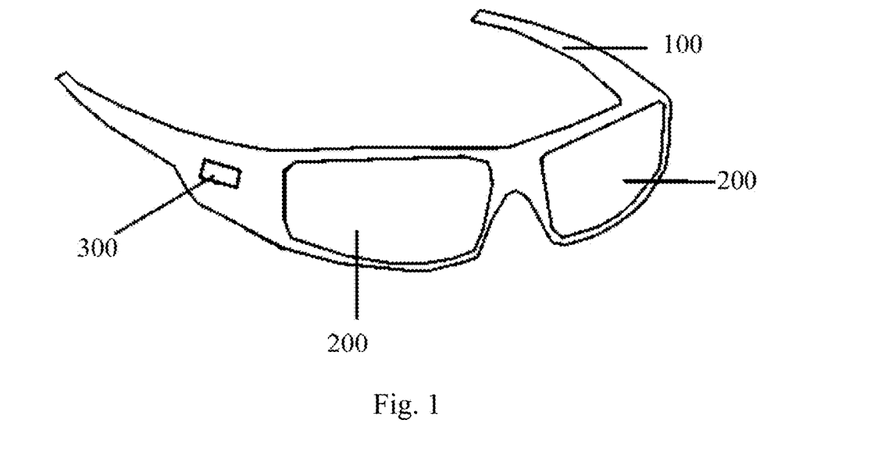
FIG. 1 is a structural schematic diagram of display spectacles provided by an embodiment of the disclosure.
Figure 2:
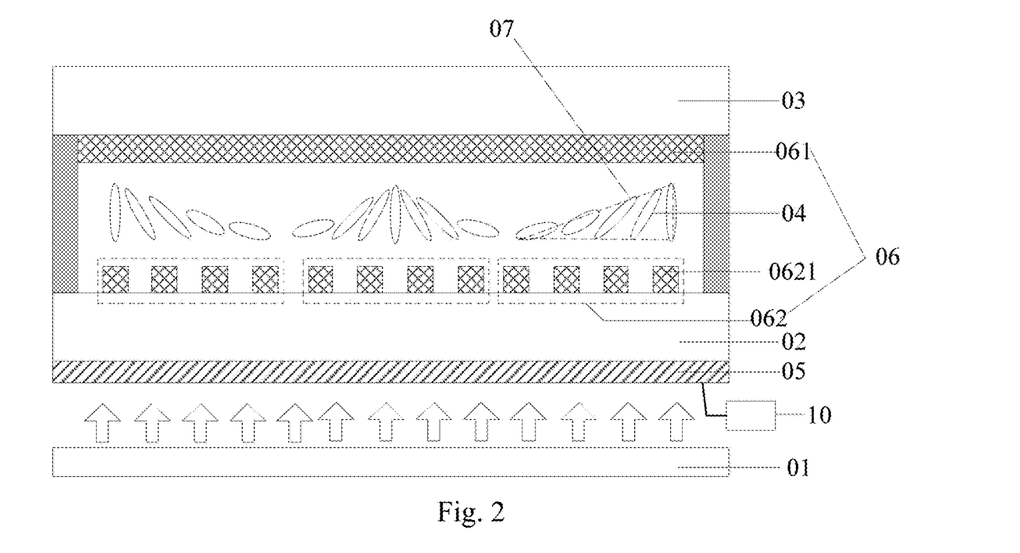
FIG. 2 is a structural schematic diagram of a display device in display spectacles provided by an embodiment of the disclosure, the display device is used as a spectacle lens.

As shown in FIG. 1, the display spectacles provided by the embodiment of the disclosure includes a spectacle frame 100 and two display devices 200 provided on the spectacle frame 100 as spectacle lenses. As shown in FIG. 2, each of the display devices 200 includes a backlight 01, a lower substrate 02 on a light exit side of the backlight 01, an upper substrate 03 arranged opposite to the lower substrate 02, a liquid crystal layer 04 located between the upper substrate 03 and the lower substrate 02, a plurality of electrode structures 06 located between the upper substrate 03 and the lower substrate 02, and a control unit 10.

During displaying, the electrode structure 06 deflects liquid crystal molecules in a corresponding region of the liquid crystal layer 04 to form a microprism structure 07. The control unit 10 adjusts a voltage on the electrode structure 06, thereby controlling total internal reflection or refraction of the microprism structure 07 for light emitted from the backlight 01.

In the context of the disclosure, the "control unit" in the embodiments can be realized by a computer (e.g. personal computer) or a combination of a computer and a suitable sensor; the processing of the unit can be realized e.g. by a processor in the computer.

In an implementation, as shown in FIG. 1, the display spectacles provided by the embodiment of the disclosure can further include a data line interface 300 for data reading and charging, corresponding internal leads, memory devices and batteries, etc., which are not discussed herein.

In addition, in the display spectacles provided by the embodiment of the disclosure, the two display devices 200 serving as spectacle lenses are independent of each other. If the images or videos displayed by these two spectacle lenses are from a 3D video source with a slight difference, 3D display, virtual reality and other functions can be easily realized.

It should be noted that, compared with the conventional liquid crystal display panel, in the display spectacles provided by the embodiment of the disclosure, each of the display devices 200 serving as spectacle lenses can have only one polarizer 05 disposed between the lower substrate 02 and the backlight 01 for converting light emitted from the backlight 01 into polarized light, and there is no need to set a polarizer on the upper substrate 03.

In an implementation, in the display spectacles provided by the embodiment of the disclosure, the microprism structure 07 can be a triangular prism structure or a polygonal prism structure. Moreover, the triangular prism structure can be a right angle triangular prism structure, which is not limited herein.

Figure 3A:
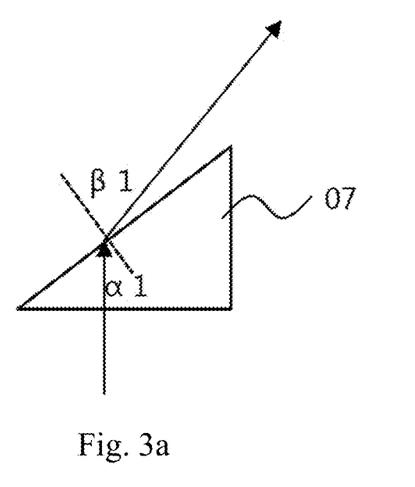
FIG. 3a and FIG. 3b are respectively working principle diagrams of microprism structures provided by some embodiments of the disclosure.
Figure 3B:
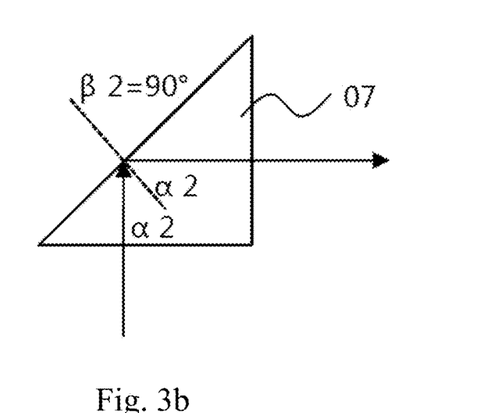

In particular, in the display spectacles provided by the embodiment of the disclosure, during displaying, the formed microprism structure(s) 07 can have two working states. The first working state is an on-state. As shown in FIG. 3a, the incident angle α1 of the light beam emitted from the backlight 01 to the microprism structure 07 is smaller than the critical angle of the microprism structure 07, and the light beam enters the human eye. The microprism structure 07 is thus in a bright state. The second working state is an off-state. As shown in FIG. 3b, the incident angle α2 of the light beam emitted from the backlight 01 to the microprism structure 07 is greater than the critical angle of the microprism structure 07, and the light beam is totally reflected inside the microprism structure 07. There is no refracted light beam entering the human eye, the microprism structure 07 is thus in a dark state.

On this basis, in an implementation, in the display spectacles provided by the embodiment of the disclosure, several microprism structures 07 constitute one sub-pixel, and a plurality of sub-pixels are arranged in an array. By adjusting the working state of the microprism structure 07 in each sub-pixel, the gray scale adjustment of each sub-pixel can be realized. In particular, when all of the microprism structures 07 contained in one sub-pixel are in the on-state, the light that enters the human eye is the most, and the sub-pixel is at the highest gray scale. When all of the microprism structures 07 contained in one sub-pixel are in the off-state, the light that enters the human eye is the least, and the sub-pixel is at the lowest gray scale.

Figure 4:
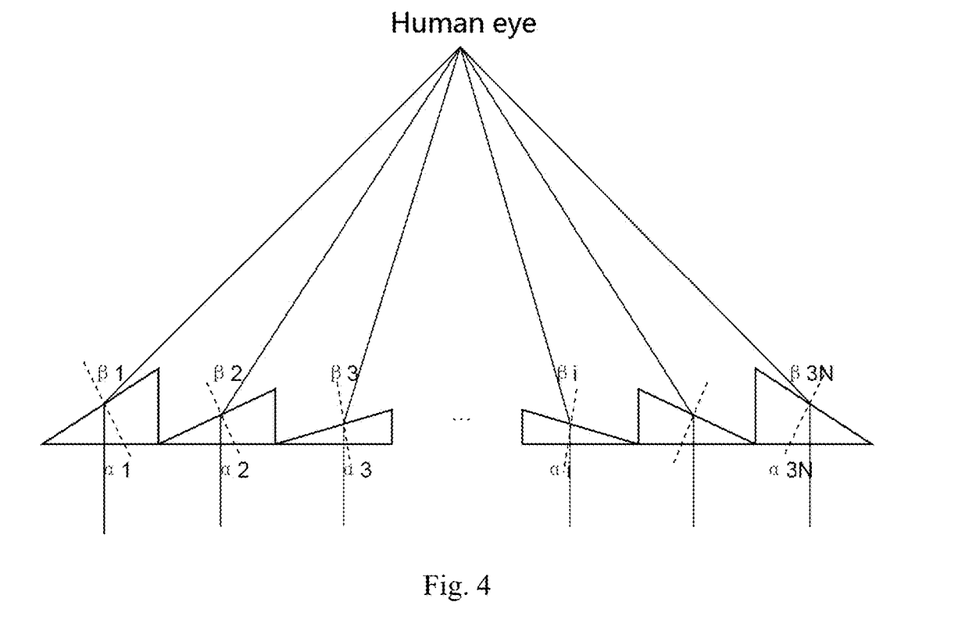
FIG. 4 is a working principle diagram of display spectacles provided by an embodiment of the disclosure.

Therefore, in order to obtain more gray scales, each sub-pixel should contain a plurality of microprism structures 07, and the ramp angles of the microprism structures 07 can be different with each other. For example, as shown in FIG. 4, every three microprism structures 07 constitutes a sub-pixel, the incident light is irradiated to these three microprism structures 07, and the incident angles are respectively $\alpha 1$, $\alpha 2$ and $\alpha 3$. When $\alpha 1$, $\alpha 2$, and $\alpha 3$ are smaller than the critical angle of the microprism structures 07, the refracted light beams with refraction angles $\beta 1$, $\beta 2$ and $\beta 3$ all enter the human eye. In this situation, the human eye sees the maximum brightness of the sub-pixel. When $\alpha 1$, $\alpha 2$ and $\alpha 3$ are equal to or greater than the critical angle of each microprism structure 07, total reflection occurs and no refracted light enters the human eye. In this situation, the human eye sees the minimum brightness of the sub-pixel. When $\alpha 1$, $\alpha 2$ and $\alpha 3$ are arranged with other angle combinations, for example, $\alpha 1$ is equal to or greater than the critical angle of the microprism structure 07, $\alpha 2$ and $\alpha 3$ is smaller than the critical angle of the microprism structure 07, then the states of these three microprism structures observed by the human eye are respectively dark, bright and bright. It can be found that if each sub-pixel contains more microprism structures 07, more bright and dark states can be presented to the human eye, i.e., more gray scales can be obtained.

In addition, in the display spectacles provided by the embodiment of the disclosure, in order to allow the human eye to see sub-pixels at different positions, different light exit angles can be set for the microprism structures 07 at different locations. Moreover, in each display device 200, the microprism structure 07 refracts light emitted from the backlight 01. An exit angle is formed between an outgoing light beam of the microprism structure 07 and a display plane of the display device 200. The exit angle decreases as a viewing distance increases.

In an implementation, in the display spectacles provided by the embodiment of the disclosure, the exit angle of each microprism structure 07 can be adjusted by adjusting the voltage applied to the electrode structure. In particular, the greater an equivalent optical path of the microprism structure along a cell thickness of the display device 200, the smaller a voltage difference applied on the electrode structure 06 corresponding to the liquid crystal molecules forming the microprism structure 07.

In an implementation, in the display spectacles provided by the embodiment of the disclosure, as shown in FIG. 2, each electrode structure 06 includes a first transparent electrode 061 and a second transparent electrode 062 respectively located on both sides of the liquid crystal layer. The first transparent electrode 061 is a planar electrode. The second transparent electrode 062 includes a plurality of sub-electrodes 0621 arranged in parallel and extending in a straight line. In some embodiments, as shown in FIG. 2, the first transparent electrode 061 can be located on the side of the upper substrate 03 facing the liquid crystal layer 04, accordingly, the second transparent electrode 062 can be located on the side of the lower substrate 02 facing the liquid crystal layer 04. Alternatively, the second transparent electrode 062 can be located on the side of the lower substrate 02 facing the liquid crystal layer 04, and the first transparent electrode 061 can be located on the side of the upper substrate 03 facing the liquid crystal layer 04, which is not limited herein.

Figure 5A:
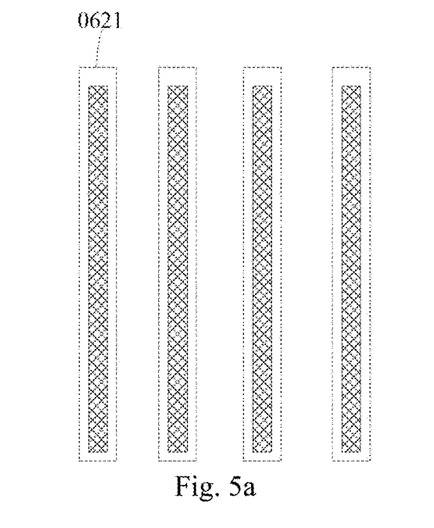
FIG. 5a to FIG. 5d are respectively structural schematic diagrams of second transparent electrodes in display spectacles provided by some embodiments of the disclosure.
Figure 5B:
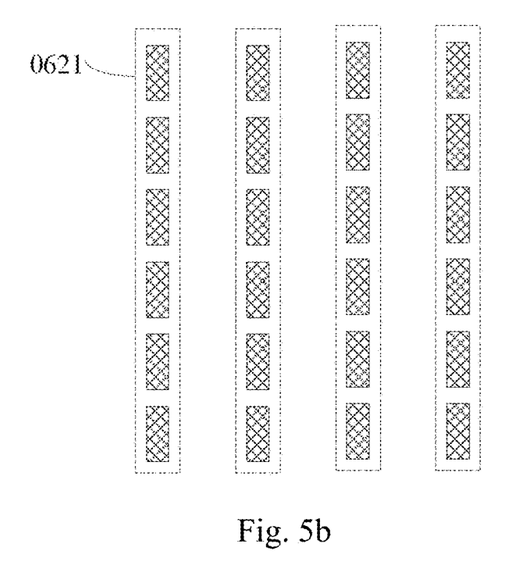
Figure 5C:
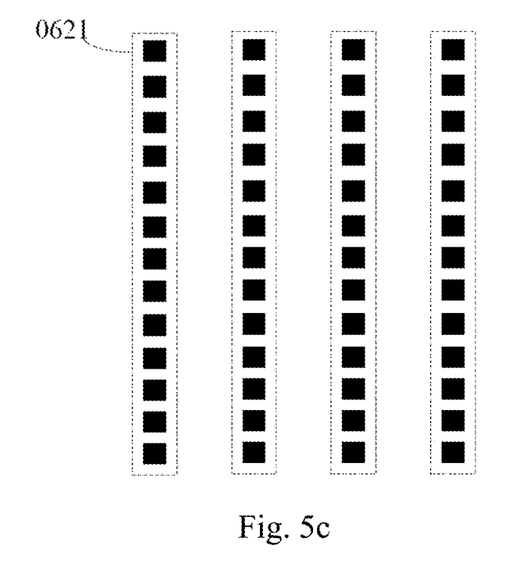
Figure 5D:
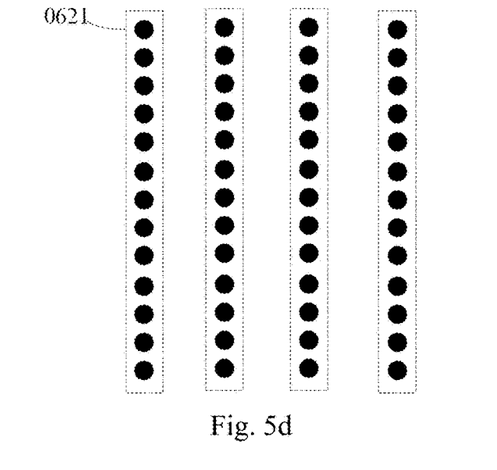

Further, in the display spectacles provided by the embodiment of the disclosure, as shown in FIG. 5a and FIG. 5b, the sub-electrode 0621 is composed of at least one linear electrode Alternatively, in an implementation, in the display spectacles provided by the embodiment of the disclosure, as shown in FIG. 5c and FIG. 5d, the sub-electrode 0621 is composed of a plurality of punctate electrodes. In some implementations, the shape of the punctate electrode can be a point having a regular shape, such as a dot, a square point. Of course, it can also be an irregularly shaped point, which is not limited herein.

Figure 6A:
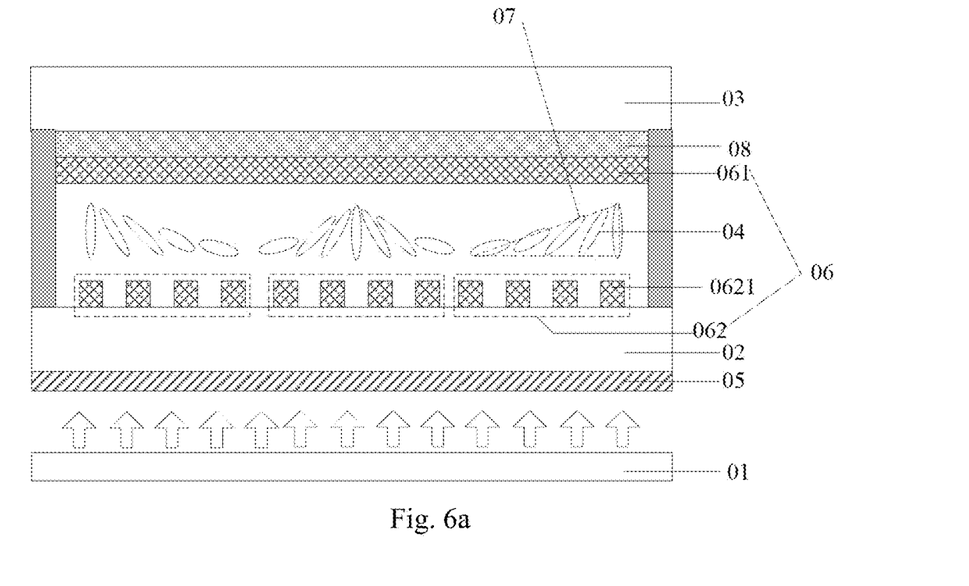
FIG. 6a to FIG. 6d are respectively structural schematic diagrams of display devices in display spectacles provided by some embodiments of the disclosure, the display devices are used as spectacle lenses.
Figure 6B:
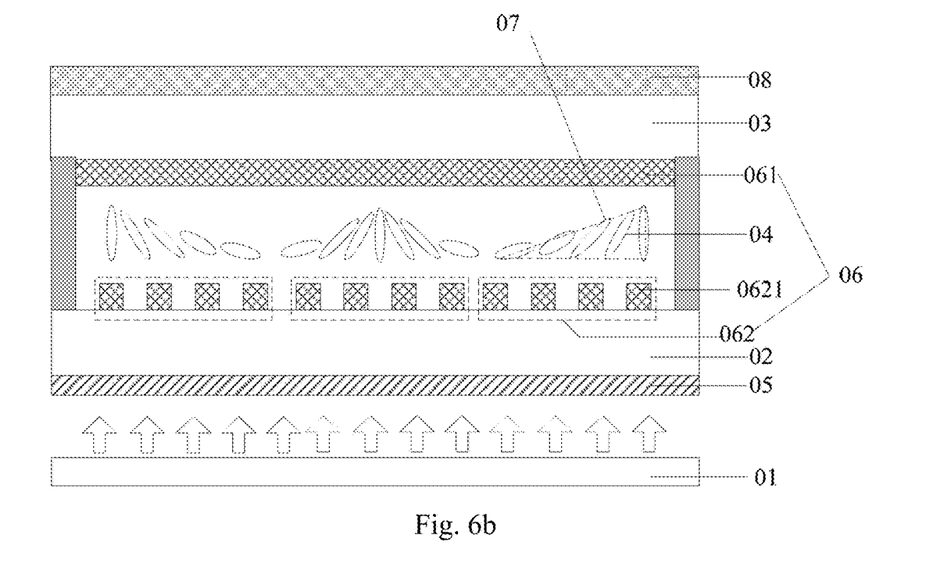
Figure 6C:
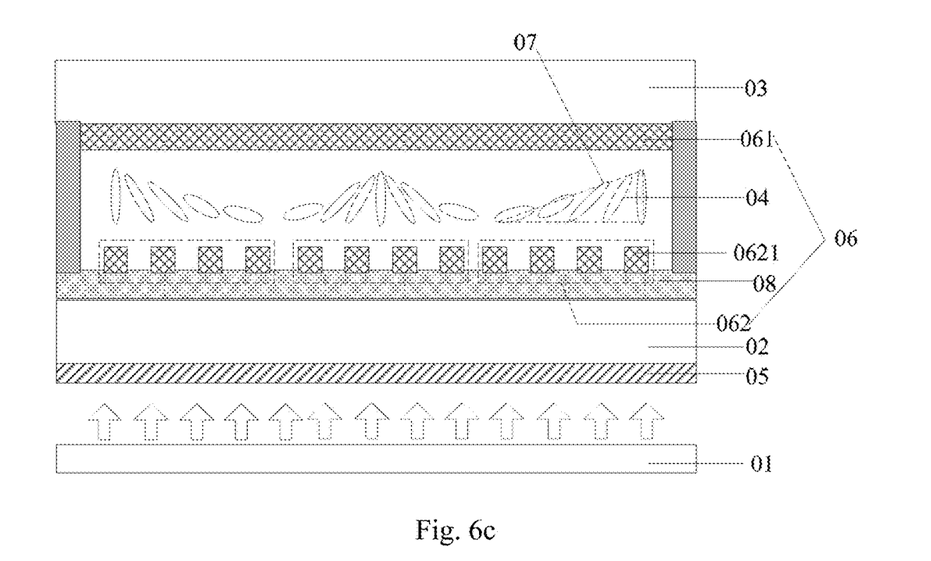
Figure 6D:
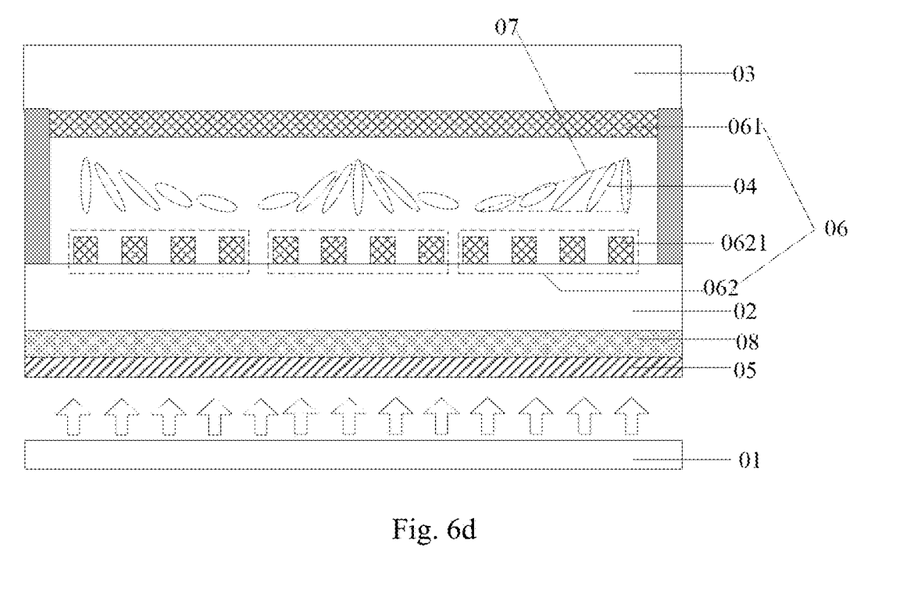

Further, in order to realize color display, in the display spectacles provided by the embodiment of the disclosure, as shown in FIG. 6a and FIG. 6b, each display device 200 further includes a color conversion layer 08. The color conversion layer 08 can be located on a side of the liquid crystal layer 04 departing from the lower substrate 02, the color conversion layer 08 is used for converting light passing through the liquid crystal layer 04 and corresponding to the microprism structure into monochromatic light. In particular, as shown in FIG. 6a, the color conversion layer 08 can be embedded between the upper substrate 03 and the lower substrate 02, specifically on the inner surface of the upper substrate 03. Of course, the color conversion layer 08 can also be provided on a side of the upper substrate 03 departing from the liquid crystal layer 04 as shown in FIG. 6b, which is not limited herein. Alternatively, the color conversion layer 08 can be located on a side of the liquid crystal layer 04 departing from the upper substrate 03, the color conversion layer 08 is used for converting light emitted from the backlight 01 and corresponding to the microprism structure 07 into monochromatic light. In particular, as shown in FIG. 6c, the color conversion layer 08 can be embedded between the upper substrate 03 and the lower substrate 02, specifically on the inner surface of the lower substrate 02. Of course, the color conversion layer 08 can also be provided between the backlight 01 and the lower substrate 02 as shown in FIG. 6d, which is not limited herein.

All light emitted from the backlight 01 is converted into light of at least three colors (e.g., R, G and B) after passing through the color conversion layer 08. Of course, light emitted from the backlight 01 can also be converted into Y, W and other colors, which is not limited herein.

Further, in the display spectacles provided by the embodiment of the disclosure, the color conversion layer 08 is a light splitting film or a color filter film with filters of at least one color. Each filter can correspond to, for example, one microprism structure, which is not limited herein.

Based on the same concept, an embodiment of the disclosure further provides a method for driving the above mentioned display spectacles. The method includes the steps of receiving an image signal to be displayed; and based on a gray scale value for a sub-pixel in the image signal to be displayed, controlling a voltage value on the electrode structure, thereby controlling total internal reflection or refraction of the microprism structure for light emitted from the backlight and displaying a corresponding gray scale.

In an implementation, the method provided by the embodiment of the disclosure further realizes three-dimensional display. In particular, the method further includes in a three-dimensional display mode, displaying different images with these two display devices respectively.

The embodiments of the present disclosure provide display spectacles and a driving method thereof. The display spectacles include a spectacle frame and two display devices provided on the spectacle frame as spectacle lenses. Each of the display devices includes a backlight, a lower substrate on a light exit side of the backlight, an upper substrate arranged opposite to the lower substrate, a liquid crystal layer located between the upper substrate and the lower substrate, a plurality of electrode structures located between the upper substrate and the lower substrate, and a control unit. During displaying, the electrode structure deflects liquid crystal molecules in a corresponding region of the liquid crystal layer to form a microprism structure. The control unit adjusts a voltage on the electrode structure, thereby controlling total internal reflection or refraction of the microprism structure for light emitted from the backlight, and the adjustment for display gray scale can thus be realized. In the display spectacles provided by the embodiment of the present disclosure, the formed microprism structure is used to control the propagation path of light emitted by the spectacle lens, thereby controlling the viewing angle for the spectacle lens. The display spectacles are adapted to the characteristics of wearable display device such as a large viewing angle and a close viewing distance.

Apparently, the person skilled in the art may make various alterations and variations to the invention without departing the spirit and scope of the invention. As such, provided that these modifications and variations of the invention pertain to the scope of the claims of the invention and their equivalents, the invention is intended to embrace these alterations and variations.

What is claimed is:

1. Display spectacles: comprising a spectacle frame and two display devices provided on the spectacle frame as spectacle lenses; each of the display devices comprising a backlight, a lower substrate on a light exit side of the backlight, an upper substrate arranged opposite to the lower substrate, a liquid crystal layer located between the upper substrate and the lower substrate, a plurality of electrode structures located between the upper substrate and the lower substrate, and a controller;
    wherein during displaying, the electrode structure deflects liquid crystal molecules in the liquid crystal layer corresponding to the electrode structure to form a microprism structure; the controller adjusts a voltage on the electrode structure, thereby controlling the microprism structure to switch between total internal reflection on light emitted from the backlight and refraction on light emitted from the backlight;
    wherein each display device further comprises a color conversion layer;
    wherein the color conversion layer is located on a side of the liquid crystal layer departing from the lower substrate; the color conversion layer is used for converting light passing through the liquid crystal layer and corresponding to the microprism structure into monochromatic light; and
    wherein light emitted from the backlight is converted into light of at least three colors after passing through the color conversion layer.

2. The display spectacles according to claim 1, wherein several microprism structures constitute one sub-pixel; and a plurality of sub-pixels are arranged in an array.

3. The display spectacles according to claim 1, wherein in each display device, the microprism structure refracts light emitted from the backlight; an exit angle is formed between an outgoing light beam of the microprism structure and a display plane of the display device; the exit angle decreases as a viewing distance increases.

4. The display spectacles according to claim 1, wherein the greater an equivalent optical path of the microprism structure along a cell thickness of the display device, the smaller a voltage difference applied on the electrode structure corresponding to the liquid crystal molecules forming the microprism structure.

5. The display spectacles according to claim 1, wherein the microprism structure is a triangular prism structure or a polygonal prism structure.

6. The display spectacles according to claim 5, wherein the triangular prism structure is a right angle triangular prism structure.

7. The display spectacles according to claim 1, wherein each electrode structure comprises a first transparent electrode and a second transparent electrode respectively located on both sides of the liquid crystal layer;
    wherein the first transparent electrode is a planar electrode;
    and wherein the second transparent electrode comprises a plurality of sub-electrodes arranged in parallel and extending in a straight line.

8. The display spectacles according to claim 7, wherein the sub-electrode is composed of at least one linear electrode or a plurality of punctate electrodes.

9. The display spectacles according to claim 1, wherein the color conversion layer is a light splitting film or a color filter film.

10. The display spectacles according to claim 1, further comprising a polarizer located between the lower substrate and the backlight.

11. The display spectacles according to claim 10, wherein each display device further comprises a color conversion layer;
    wherein the color conversion layer is located on a side of the liquid crystal layer departing from the lower substrate, and the color conversion layer is used for converting light passing through the liquid crystal layer and corresponding to the microprism structure into monochromatic light; alternatively, the color conversion layer is located on a side of the liquid crystal layer departing from the upper substrate, and the color conversion layer is used for converting light emitted from the backlight and corresponding to the microprism structure into monochromatic light;
    and wherein light emitted from the backlight is converted into light of at least three colors after passing through the color conversion layer.

12. The display spectacles according to claim 1, wherein in each display device, the microprism structure refracts light emitted from the backlight; an exit angle is formed between an outgoing light beam of the microprism structure and a display plane of the display device; the exit angle decreases as a viewing distance increases.

13. The display spectacles according to claim 1, wherein the greater an equivalent optical path of the microprism structure along a cell thickness of the display device, the smaller a voltage difference applied on the electrode structure corresponding to the liquid crystal molecules forming the microprism structure.

14. Display spectacles: comprising a spectacle frame and two display devices provided on the spectacle frame as spectacle lenses; each of the display devices comprising a backlight, a lower substrate on a light exit side of the backlight, an upper substrate arranged opposite to the lower substrate, a liquid crystal layer located between the upper substrate and the lower substrate, a plurality of electrode structures located between the upper substrate and the lower substrate, and a controller;

wherein during displaying, the electrode structure deflects liquid crystal molecules in the liquid crystal layer corresponding to the electrode structure to form a microprism structure; the controller adjusts a voltage on the electrode structure, thereby controlling the microprism structure to switch between total internal reflection on light emitted from the backlight and refraction on light emitted from the backlight;

wherein each display device further comprises a color conversion layer;

wherein the color conversion layer is located on a side of the liquid crystal layer departing from the upper substrate; the color conversion layer is used for converting light emitted from the backlight and corresponding to the microprism structure into monochromatic light; and wherein light emitted from the backlight is converted into light of at least three colors after passing through the color conversion layer.

15. The display spectacles according to claim 14, wherein the color conversion layer is a light splitting film or a color filter film.

16. The display spectacles according to claim 14, wherein in each display device, the microprism structure refracts light emitted from the backlight; an exit angle is formed between an outgoing light beam of the microprism structure and a display plane of the display device; the exit angle decreases as a viewing distance increases.

17. The display spectacles according to claim 14, wherein the greater an equivalent optical path of the microprism structure along a cell thickness of the display device, the smaller a voltage difference applied on the electrode structure corresponding to the liquid crystal molecules forming the microprism structure.

\* \* \* \* \*